US009566544B2

(12) United States Patent
Iwasaki et al.

(10) Patent No.: US 9,566,544 B2
(45) Date of Patent: Feb. 14, 2017

(54) HONEYCOMB STRUCTURE

(71) Applicant: SUMITOMO CHEMICAL COMPANY, LIMITED, Chuo-ku, Tokyo (JP)

(72) Inventors: Kentaro Iwasaki, Wroclaw (PL); Hajime Yoshino, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 310 days.

(21) Appl. No.: 14/390,112

(22) PCT Filed: Mar. 29, 2013

(86) PCT No.: PCT/JP2013/059513
§ 371 (c)(1),
(2) Date: Oct. 2, 2014

(87) PCT Pub. No.: WO2013/150970
PCT Pub. Date: Oct. 10, 2013

(65) Prior Publication Data
US 2015/0072104 A1 Mar. 12, 2015

(30) Foreign Application Priority Data

Apr. 5, 2012 (JP) ................................. 2012-086481

(51) Int. Cl.
*B01D 46/24* (2006.01)
*F01N 3/02* (2006.01)
(Continued)

(52) U.S. Cl.
CPC ....... *B01D 46/2474* (2013.01); *B01D 39/2068* (2013.01); *B01D 46/247* (2013.01);
(Continued)

(58) Field of Classification Search
None
See application file for complete search history.

(56) References Cited

U.S. PATENT DOCUMENTS 4,417,908 A 11/1983 Pitcher, Jr.
2009/0205301 A1* 8/2009 Komori ................. F01N 3/0222
55/523

FOREIGN PATENT DOCUMENTS

EP 2380649 A1 10/2011
JP S58-196820 A 11/1983
(Continued)

OTHER PUBLICATIONS

Communication dated Dec. 18, 2015 from the European Patent Office issued in corresponding European Application No. 13772292.2.
(Continued)

*Primary Examiner* — David Sample
*Assistant Examiner* — Nicholas W Jordan
(74) *Attorney, Agent, or Firm* — Sughrue Mion, PLLC

(57) ABSTRACT

A cylindrical honeycomb structure 1 has a partition wall 3 forming A channels 5 and B channels 6. The A channels 5 are open at a first end surface 1a and closed at a second end surface 1b. The B channels 6 are closed at the first end surface 1a and open at the second end surface 1b. The B channels 6 include a first B channel 11 and a second B channel 13 extending substantially in parallel to each other. The A channels 5 include first A channels 10, which surround the first B channel at the first end surface, and second A channels 12, which surround the second B channel at the first end surface. The partition wall 3 has a first group partition wall 18, which separates adjacent channels of the first A channels 10 and the second A channels 12 from each other.

5 Claims, 12 Drawing Sheets

(51) Int. Cl.
*F01N 3/022* (2006.01)
*B01D 39/20* (2006.01)

(52) U.S. Cl.
CPC ....... *B01D 46/2459* (2013.01); *F01N 3/0222* (2013.01); *B01D 2046/2492* (2013.01); *F01N 2330/06* (2013.01); *F01N 2330/34* (2013.01); *F01N 2330/48* (2013.01); *F01N 2330/60* (2013.01); *Y02T 10/20* (2013.01); *Y10T 428/24157* (2015.01)

(56) References Cited

FOREIGN PATENT DOCUMENTS

| | | |
|---|---|---|
| JP | 2003-205245 A | 7/2003 |
| JP | 2005-220848 A | 8/2005 |
| JP | 2009-202143 A | 9/2009 |
| JP | 2011-167581 A | 9/2011 |
| JP | 2012-254438 A | 12/2012 |

OTHER PUBLICATIONS

Office Action issued Jun. 16, 2016 in corresponding Mexican Patent Application No. MX/2014/011868 with English translation.
Office Action dated Sep. 18, 2015, issued by the Korean Intellectual Property Office in counterpart Korean Patent Application No. 10-2014-7029709.
English Translation of the International Preliminary Report on Patentability and Written Opinion mailed Oct. 16, 2014 in counterpart International Application No. PCT/JP2013/059513.
First Office Action issued Jun. 2, 2015 in counterpart Chinese Patent Application No. 201380018335.X with translation.
Communication dated Dec. 1, 2015, issued by the Japan Patent Office in counterpart Japanese Application No. 2012-086481.

\* cited by examiner

HONEYCOMB STRUCTURE

CROSS REFERENCE TO RELATED APPLICATIONS

This application is a National Stage of International Application No. PCT/JP2013/059513 filed Mar. 29, 2013, claiming priority based on Japanese Patent Application No. P2012-086481 filed Apr. 5, 2012, the contents of all of which are incorporated herein by reference in their entirety.

TECHNICAL FIELD

The present invention relates to a honeycomb structure used as a filter that purifies a gas.

BACKGROUND ART

A honeycomb structure is widely used as a filter that purifies an exhausted gas from an internal combustion engine, such as a diesel particulate filter (see Patent Literature 1, for example). Since soot removed from an exhaust gas build up in the honeycomb structure, filter regeneration in which the soot is burned is required every fixed period. To burn soot, a large amount of hot combusted exhaust gas may be supplied to ignite the soot and burn it completely.

CITATION LIST

Patent Literature

Patent Literature 1: Japanese Patent Application Laid-Open Publication No. 2009-202143

SUMMARY OF INVENTION

Technical Problem

When a honeycomb structure is heated beyond an acceptable level by burning the soot in the filter regeneration, excessive thermal stress may occur and break the honeycomb structure. To avoid such breakage, a technology for moderating the burning of the soot in the filter regeneration is required.

The present invention has been made in view of the problem described above, and an object of the present invention is to provide a honeycomb structure that allows soot to be mildly burned in filter regeneration.

Solution to Problem

To achieve the object described above, the present invention relates to a honeycomb structure including a first end surface and a second end surface facing each other, and a partition wall that forms a plurality of A channels and a plurality of B channels extending in a facing direction between the first end surface and the second end surface. The plurality of A channels are open at the first end surface and closed at the second end surface, and the plurality of B channels are closed at the first end surface and open at the second end surface. The plurality of B channels include a first B channel and a second B channel extending in substantially parallel to each other. The plurality of A channels include a plurality of first A channels that surround the first B channel at the first end surface and a plurality of second A channels that surround the second B channel at the first end surface. The plurality of first A channels are adjacent to the first B channel but are not adjacent to the second B channel at the first end surface, and the plurality of second A channels are adjacent to the second B channel but are not adjacent to the first B channel at the first end surface. The partition wall includes a first standard wall that separates the plurality of first A channels and the first B channel from each other, a second standard wall that separate the plurality of second A channels and the second B channel from each other, a first common wall that separates adjacent two of the first A channels from each other, a second common wall that separates adjacent two of the second A channels from each other, and a first partition wall that separates adjacent channels of the first A channels and the second A channels from each other.

According to the honeycomb structure described above, since the first A channel and the second A channel adjacent to each other are separated from each other by the first partition wall, the flow rate of a gas flowing through portions in the vicinity of the first partition wall can be made slower than in a case where the first partition wall is not present and the first A channel and the second A channel adjacent to each other form a large single A channel. In the thus configured honeycomb structure, when a hot gas flows into the A channels and burns soot in filter regeneration, a burned gas resulting from the burning (such as carbon dioxide gas) is unlikely to exit through portions in the vicinity of the first partition wall and hence further oxygen supply is suppressed. Therefore, according to the honeycomb structure described above, in which oxygen supply is suppressed, built-up soot on the first partition wall is unlikely to be encouraged to burn, whereby soot in the first A channel and the second A channel adjacent to each other is not burned together in a short period, but the soot can be mildly burned. As a result, a situation in which the honeycomb structure is heated beyond an acceptable level and damaged by the resultant excessive thermal stress does not occur, whereby the reliability of the honeycomb structure can be improved.

In the honeycomb structure according to the present invention, the first partition wall may be thinner than the first standard wall and the second standard wall.

According to the honeycomb structure described above, since the first partition wall is thinner than the first standard wall and the second standard wall, the opening ratios of first A channels and the second A channels separated from each other by the first partition wall can be increased, whereby soot collection efficiency can be improved. Moreover, the improvement in soot collection efficiency increases the amount of soot that suppresses the burning, whereby the soot can be more mildly burned in the honeycomb structure.

In the honeycomb structure according to the present invention, the first common walls and the second common walls may be thinner than the first standard wall and the second standard wall.

According to the honeycomb structure described above, the thin first common walls and second common walls allow the opening ratios of the first A channels and the second A channels to be increased, whereby the soot collection efficiency can be improved. On the other hand, the relatively thick first standard wall and second standard wall cause a burned gas in the A channels to be unlikely to exit into the B channels in filter regeneration, whereby further oxygen supply is suppressed in the A channels and the soot can be more mildly burned.

In the honeycomb structure according to the present invention, the plurality of B channels may include a third B channel that extends substantially in parallel to the first B channel and the second B channel. The plurality of A channels may include a plurality of third A channels that surround the third B channel at the first end surface. The plurality of third A channels may be adjacent to the third B channel but are not adjacent to the first B channel or the second B channel at the first end surface. The partition wall may further include a second partition wall that separates adjacent channels of the first A channels and the third A channels from each other and a third partition wall that separates adjacent channels of the second A channels and the third A channels from each other. The plurality of A channels may further include an interstice channel formed by the first partition wall, the second partition wall, and the third partition wall.

In the honeycomb structure described above, since the interstice channel formed by the first partition wall, the second partition wall, and the third partition wall is surrounded by the first to third A channels but is not adjacent to the B channels, a burned gas in the interstice channel is unlikely to exit into the B channels. Therefore, according to the honeycomb structure described above, further oxygen supply is suppressed in the interstice channel and hence burning of soot can be delayed, whereby soot can be more mildly burned in the honeycomb structure.

Advantageous Effect of Invention

Any of the honeycomb structures according to the present invention allows soot to be mildly burned in filter regeneration.

DESCRIPTION OF EMBODIMENTS

Preferred embodiments of the present invention will be described below in detail with reference to the drawings.

First Embodiment

Figure 1:
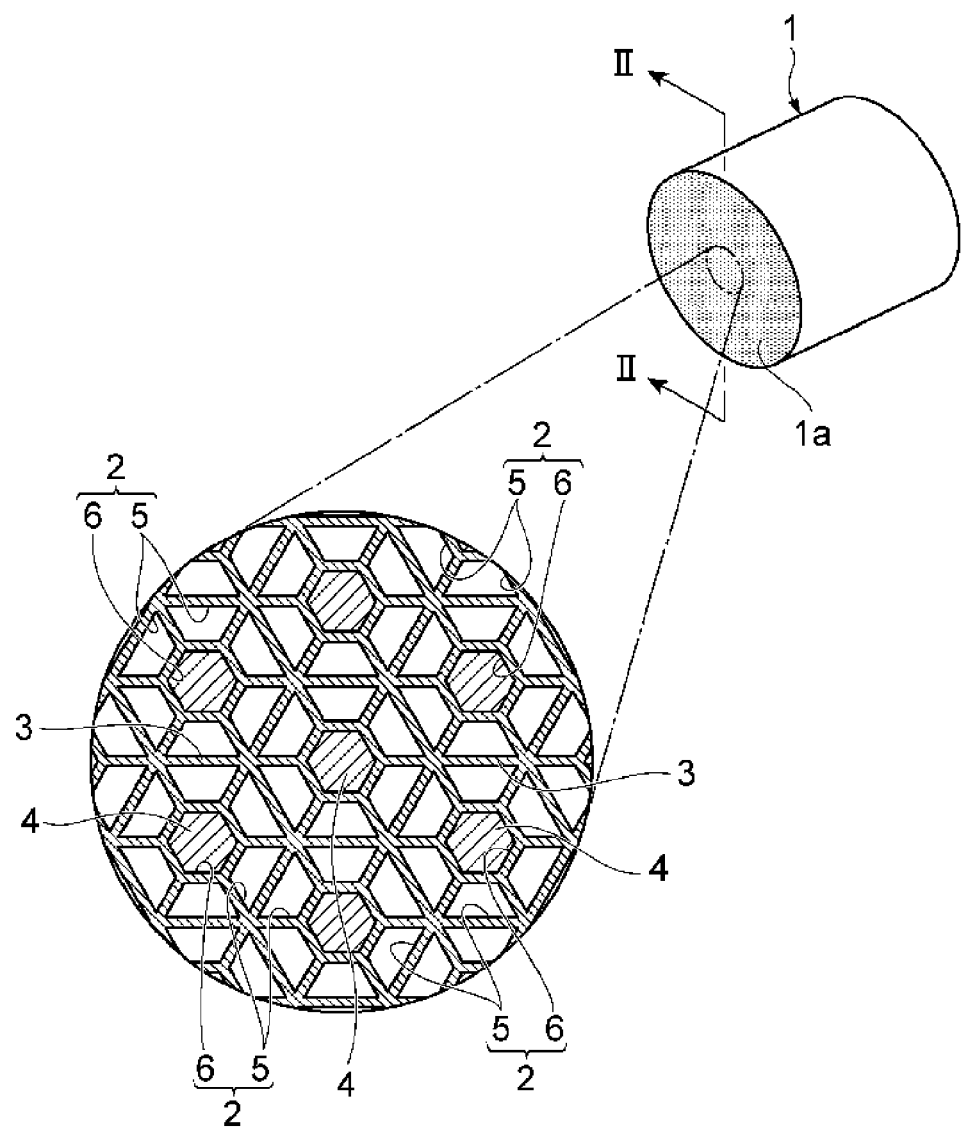
FIG. 1 shows a honeycomb structure according to a first embodiment.
Figure 2:
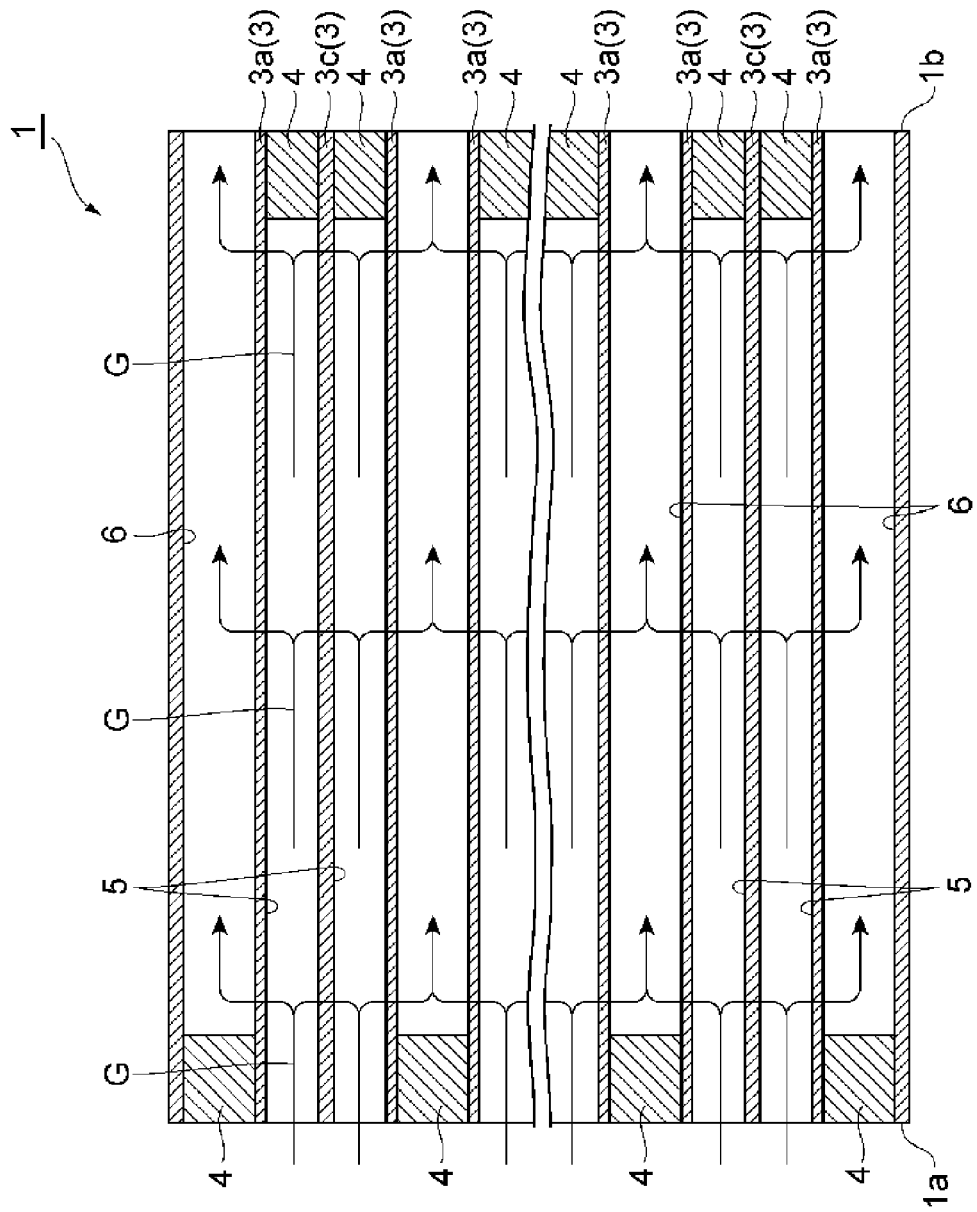
FIG. 2 is a cross-sectional view taken along the line II-II in FIG. 1.

A honeycomb structure 1 according to a first embodiment is a cylindrical structure used as a filter that purifies an exhaust gas from an internal combustion engine, such as a diesel engine and a gasoline engine, as shown in FIGS. 1 and 2.

The cylindrical honeycomb structure 1 has a first end surface 1a and a second end surface 1b, which face each other, and a partition wall 3, which forms a plurality of channels 2 extending in the direction in which the first end surface 1a and the second end surface 1b face each other. The cross-sectional shapes of the channels 2 and the partition wall 3 (cross-sectional shapes perpendicular to channels 2) do not change in the direction in which the first end surface 1a and the second end surface 1b face each other but are constant.

The channels 2 are closed by closing members 4 at one of the first end surface 1a and the second end surface 1b, as shown in FIG. 2. Specifically, the plurality of channels 2 are classified into A channels 5, which are open at the first end surface 1a and closed at the second end surface 1b, and B channels 6, which are closed at the first end surface 1a and open at the second end surface 1b.

The plurality of A channels 5 and the plurality of B channels 6 are channels that are substantially parallel to each other and extend in the direction in which the first end surface 1a and the second end surface 1b face each other. The A channels 5 each have a trapezoidal (isosceles-trapezoid-like) cross-sectional shape perpendicular to the direction in which they extend, and the B channels 6 each have a regular hexagonal cross-sectional shape perpendicular to the direction in which they extend.

The A channels 5 and the B channels 6 are so arranged that a plurality of the A channels 5 surround each of the channels B at the first end surface 1a. Specifically, six A channels 5 are so arranged that they surround one B channel 6. Further, the six A channels 5 are so arranged that they are adjacent to the central B channel 6. According to the arrangement, the opening ratio of the first end surface 1a is greater than the opening ratio of the second end surface 1b.

The thus configured honeycomb structure 1 is disposed in an exhaust gas channel of an internal combustion engine with the first end surface 1a located on the gas upstream side (side facing internal combustion engine) and the second end surface 1b located on the gas downstream side (exhaust side). The arrows G represent a primary flow of the exhaust gas passing through the honeycomb structure 1, which functions as a filter.

The exhaust gas from the internal combustion engine flows into the A channels 5 through the openings at the first end surface 1a, as indicated by the arrows G. The gas having flowed into the A channels 5 passes through the partition wall 3 into the B channels 6 because the A channels 5 are closed at the second end surface 1b. At this point, soot in the exhaust gas is trapped by the partition wall 3. The gas from which soot has been removed passes through the B channels 6 and flows outside through the openings of the B channels 6 at the second end surface 1b.

The honeycomb structure 1, which serves as a filter, is composed, for example, of a porous ceramic material (20 μm in average pore diameter or smaller, for example). Examples of the ceramic material used for the honeycomb structure 1 may include oxides such as alumina, silica, mullite, cordierite, glass, and aluminum titanate; silicon carbide; silicon nitride; and metals. The aluminum titanate can further contain magnesium and/or silicon.

The honeycomb structure 1 is produced by burning a green molded body (pre-burned molded body) which can form the ceramic materials described above after extrusion molding thereof and then performing a predetermined closing treatment. The green molded body contains, for example, inorganic compound source powder that is a raw material of the ceramic material, methyl cellulose or any other organic binder, and an additive added as required.

In the case of a green molded body made of an aluminum titanate, the inorganic-compound-based powder contains aluminum source powder such as α-alumina powder and titanium source powder such as anatase-type or rutile-type titania powder and can further contain magnesium source powder such as magnesia powder and magnesia spinel powder, and/or silicon source power such as silicon oxide powder and glass flit, as required.

Examples of the organic binder include celluloses such as methyl cellulose, carboxymethyl cellulose, hydroxyalkyl methyl cellulose, and sodium carboxymethyl cellulose; alcohols such as polyvinyl alcohol; and lignin sulfonate.

Examples of the additive may include a pore former, a lubricant, a plasticizer, a disperser, and a solvent.

Examples of the pore former include carbon materials such as graphite; resins such as polyethylene, polypropylene, and polymethylmethacrylate; plant materials such as starch, the shell of a nut, the shell of a walnut, and corn; ice; and dry ice.

Examples of the lubricant and the plasticizer include alcohols such as glycerin; higher fatty acids such as caprylic acid, lauric acid, palmitic acid, arachidic acid, oleic acid, and stearic acid; metal salt stearates such as aluminum stearate; and polyoxy alkylene alkyl ether (POAAE).

Examples of the disperser include inorganic acids such as nitric acid, hydrochloric acid, and sulfuric acid; organic acid such as oxalic acid, citric acid, acetic acid, malic acid, and lactic acid; alcohols such as methanol, ethanol, and propanol; surfactants such as polycarboxylic aluminum.

Examples of the solvent include alcohols such as methanol, ethanol, butanol, and propanol; glycols such as propylene glycol, polypropylene glycol, and ethylene glycol; and water.

The material of the closing members 4 may be the same as the material of the green molded body described above or may be different therefrom. The closing members 4 may instead be composed of a material through which the exhaust gas from the internal combustion engine cannot pass.

The channels 2 and the partition wall 3 of the honeycomb structure 1 will subsequently be described in detail.

Figure 3:
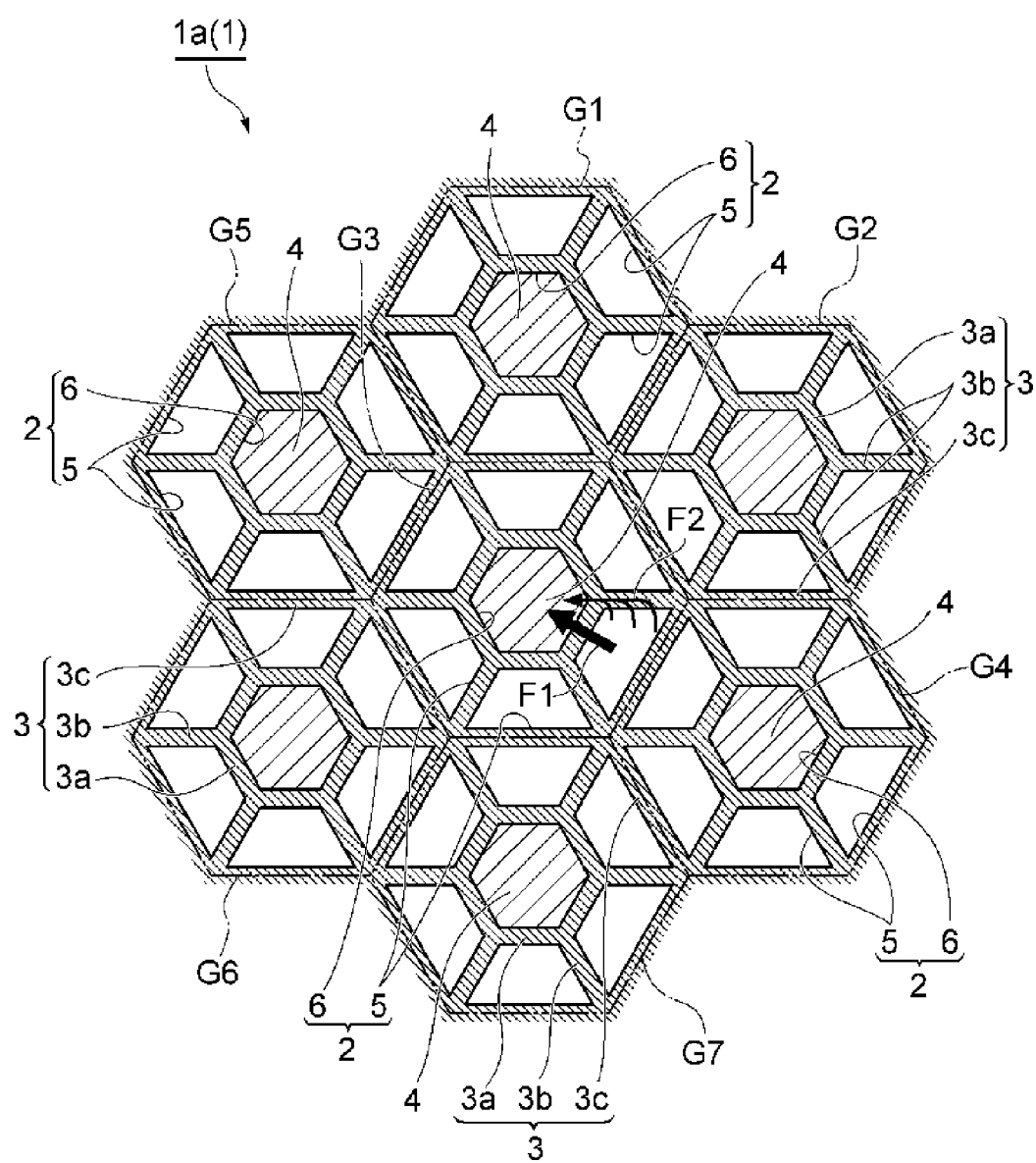
FIG. 3 is an enlarged view showing the arrangement of channels at a first end surface.

FIG. 3 describes the arrangement of the channels at the first end surface 1a. The plurality of A channels 5 and the plurality of B channels 6 can be classified into a plurality of channel groups each formed of six A channels 5 and one B channel 6, as shown in FIG. 3. FIG. 3 shows seven channel groups G1 to G7. The channel groups G1 to G7 shown in FIG. 3 are part of the first end surface 1a, and channel groups that are not shown in FIG. 3 are further arranged around the channel groups G1 to G7.

In each of the channel groups G1 to G7, six A channels 5 are so arranged at the first end surface 1a that they surround one B channel 6. Each of the A channels 5 is so disposed that it is adjacent to the B channel 6 in the same channel group but is not adjacent to the B channels 6 in the other channel groups. The situation in which "channels are adjacent to each other" means that two channels are disposed in the thickness direction of the partition wall but separated from each other with the single partition wall 3 therebetween. The channel groups G1 to G7 are configured in the same manner and so grouped along the partition wall 3 that each of the groups has a regular hexagonal shape.

The partition wall 3 has standard walls 3a, which separate A channels 5 from a B channel 6, which are adjacent to each other, common walls 3b, which separate two A channels 5 adjacent to each other in the same channel group from each other, and a group partition wall 3c, which separates the channel groups G1 to G7, which are adjacent to each other, from each other, as shown in FIGS. 1 to 3. The standard walls 3a, the common walls 3b, and the group partition wall 3c are walls having the same constant thickness.

Each of the standard wall 3a is so disposed at the first end surface 1a that the standard wall 3a forms a regular hexagonal shape and surrounds the corresponding B channel 6. That is, each of the B channels 6 is formed by the regular hexagonally arranged standard wall 3a disposed therearound. The exhaust gas in the A channels 5 passes through the standard walls 3a into the B channels 6.

The common walls 3b are arranged in each of the channel groups between the six A channels 5 and six of the common walls 3b are radially formed around the B channel 6 at the first end surface 1a. Specifically, the common walls 3b are so formed that they extend radially outward (toward outer circumference of honeycomb structure 1) from the vertices of the regular hexagonally arranged standard wall 3a at the first end surface 1a. The radially extending common walls 3b are partially connected to the standard wall 3a.

The group partition wall 3c is so formed that it surrounds the respective channel groups and arranged in the form of a honeycomb formed of regular hexagons at the first end surface 1a. The group partition wall 3c is so formed that it is separate from the standard walls 3a and connected only to the common walls 3b. The three types of wall, the group partition wall 3c, the standard walls 3a, the common walls 3b form the A channels 5.

In FIG. 3, the arrows F1 and F2 indicate the flow of the exhaust gas that flows from one of the A channels 5 into the corresponding B channel 6. The arrow F1 indicates a primary flow of the exhaust gas that flows from the A channel 5, passes through the standard wall 3a, and flows into the B channel 6. The arrow F2 indicates the flow of part of the exhaust gas that flows from portions in the vicinity of one of the common walls 3b and the group partition wall 3c into the common wall 3b, passes through the common wall 3b, and flows through the standard wall 3a into the B channel 6.

On the common wall 3b and the group partition wall 3c other than the standard wall 3a, soot is collected due to an effect of the flow indicated by the arrow F2 and precipitation and a soot layer builds up. Since the built-up soot layer degrades the filter performance of the honeycomb structure 1, filter regeneration in which a hot gas (hot combusted exhaust gas) is supplied to burn built-up soot is required.

Figure 4:
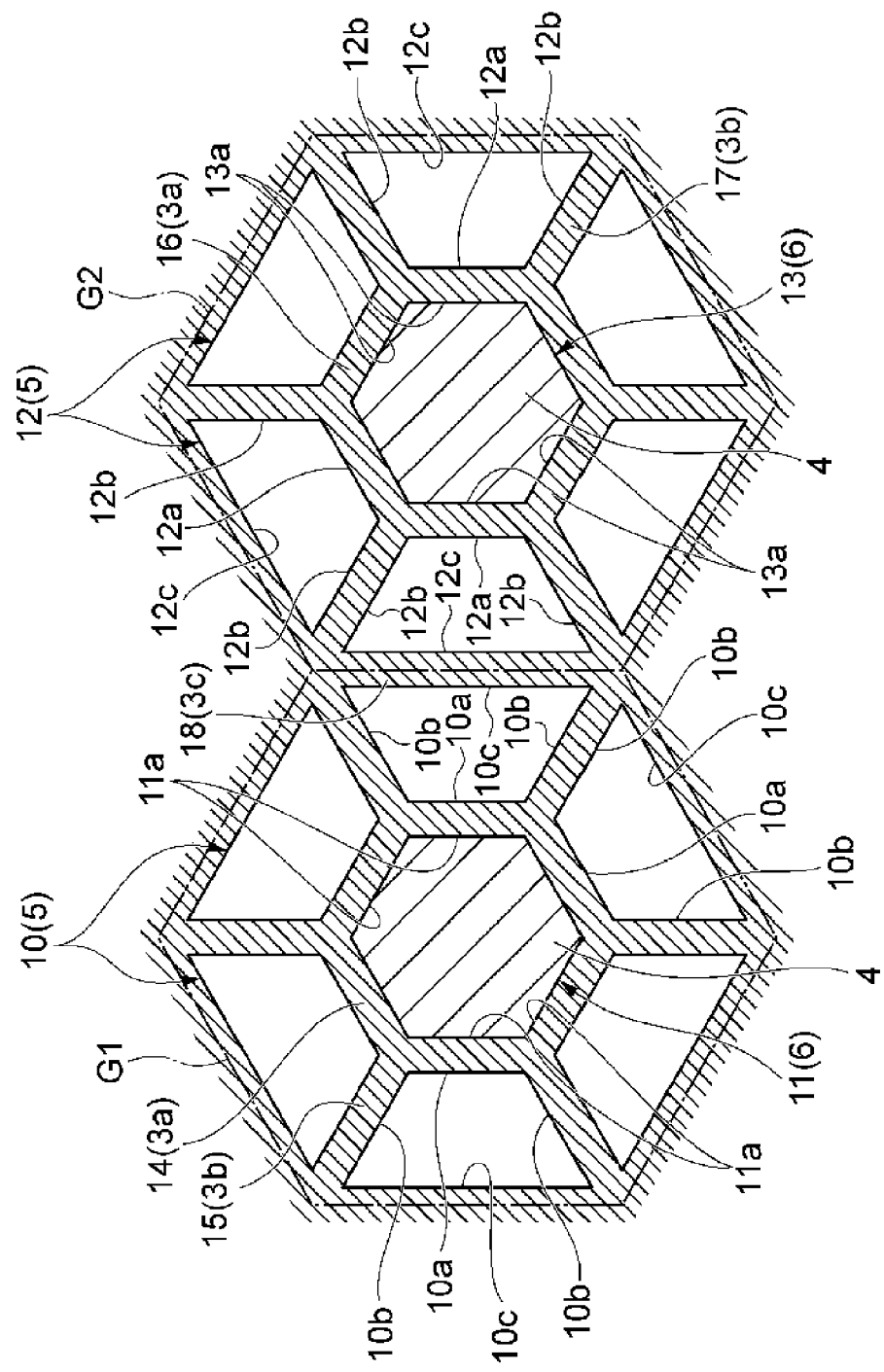
FIG. 4 is an enlarged view of part of FIG. 3 and shows two channel groups.

Among the channel groups G1 to G7, two channel groups, the channel groups G1 and G2, will next be described by way of example in detail. FIG. 4 is an enlarged view showing the channel groups G1 and G2 at the first end surface 1a.

In FIG. 4, the six A channels 5 that form the channel group G1 is called first A channels 10, and the B channel 6 that forms the channel group G1 is called a first B channel 11. Similarly, the six A channels 5 that form the channel group G2 is called second A channels 12, and the B channel 6 that forms the channel group G2 is called a second B channel 13.

Further, in the channel group G1 in FIG. 4, the standard wall 3a that separates the first A channels 10 and the first B channel 11 from each other is called a first standard wall 14, and the common wall 3b that separates adjacent two first A channels 10 from each other is called a first common wall 15. Similarly, in the channel group G2 in FIG. 4, the standard wall 3a that separates the second A channels 12 and the second B channel 13 from each other is called a second standard wall 16, and the common wall 3b that separates adjacent two second A channels 12 is called a second common wall 17. Further, the group partition wall 3c that separates the channel group G1 and the channel group G2 in FIG. 4 from each other is called a first group partition wall 18.

In the channel group G1, the six first A channels 10 are so disposed that upper base sides 10a of the trapezoidal cross-sectional shape thereof face respective sides 11a of the regular hexagonal cross-sectional shape of the first B channel 11, as shown in FIG. 4. The sides 10a of the first A channels 10 and the sides 11a of the first B channel 11, which face each other, are separated from each other by the first standard wall 14.

The six first A channels 10 are so disposed that the sides 10b (sides of trapezoidal shape other than upper and lower bases) of first A channels 10 adjacent to each other face each other. The sides 10b of the two first A channels 10 facing each other are separated from each other by the corresponding first common wall 15.

The second channel group G2 is configured in the same manner as the channel group G1. In the channel group G2 as well, sides 12a of the second A channel 12 and sides 13a of the second B channel 13 are separated by the second standard wall 16. Further, in second A channels 12 adjacent to each other in the channel group G2, sides 12b facing each other (sides 12b of different second A channels 12) are separated from each other by the second common walls 17.

The first group partition wall 18 is a wall that separates the two channel groups G1 and G2. The first group partition wall 18 separates, among the channels that form the channel group G1 and the channel group G2, a first A channel 10 and a second A channel 12 adjacent to each other. That is, the first group partition wall 18 separates a side 10c of the first A channel 10 and a side 12c of the second A channel 12 adjacent to each other. The first group partition wall 18 in relation to the two channel groups G1 and G2 corresponds to the first partition wall set forth in the claims. The sides 10c and 12c are lower base sides of the trapezoidal cross-sectional shapes of the A channels 10 and 12.

In the honeycomb structure 1 according to the first embodiment described above, since the first A channel 10 and the second A channel 12 adjacent to each other are separated from each other by the first group partition wall 18, the flow rate of the gas flowing through portions in the vicinity of the first group partition wall 18 can be made slower than in a case where the first group partition wall 18 is not present and the first A channel 10 and the second A channel 12 adjacent to each other form a large single A channel. In the thus configured honeycomb structure 1, when a hot gas flows into the A channels 5 and burns soot in the filter regeneration, a burned gas resulting from the burning (such as carbon dioxide gas) is unlikely to exit from portions in the vicinity of the first group partition wall 18 and hence further oxygen supply is suppressed.

Therefore, according to the honeycomb structure 1, in which oxygen supply is suppressed, built-up soot on the first group partition wall 18 is unlikely to be encouraged to burn, whereby soot in the first A channel 10 and the second A channel 12 is not burned together in a short period, but the soot can be mildly burned. As a result, a situation in which the honeycomb structure 1 is heated beyond an acceptable level and damaged by the resultant excessive thermal stress does not occur, whereby the reliability of the honeycomb structure 1 can be improved.

Second Embodiment

Figure 5:
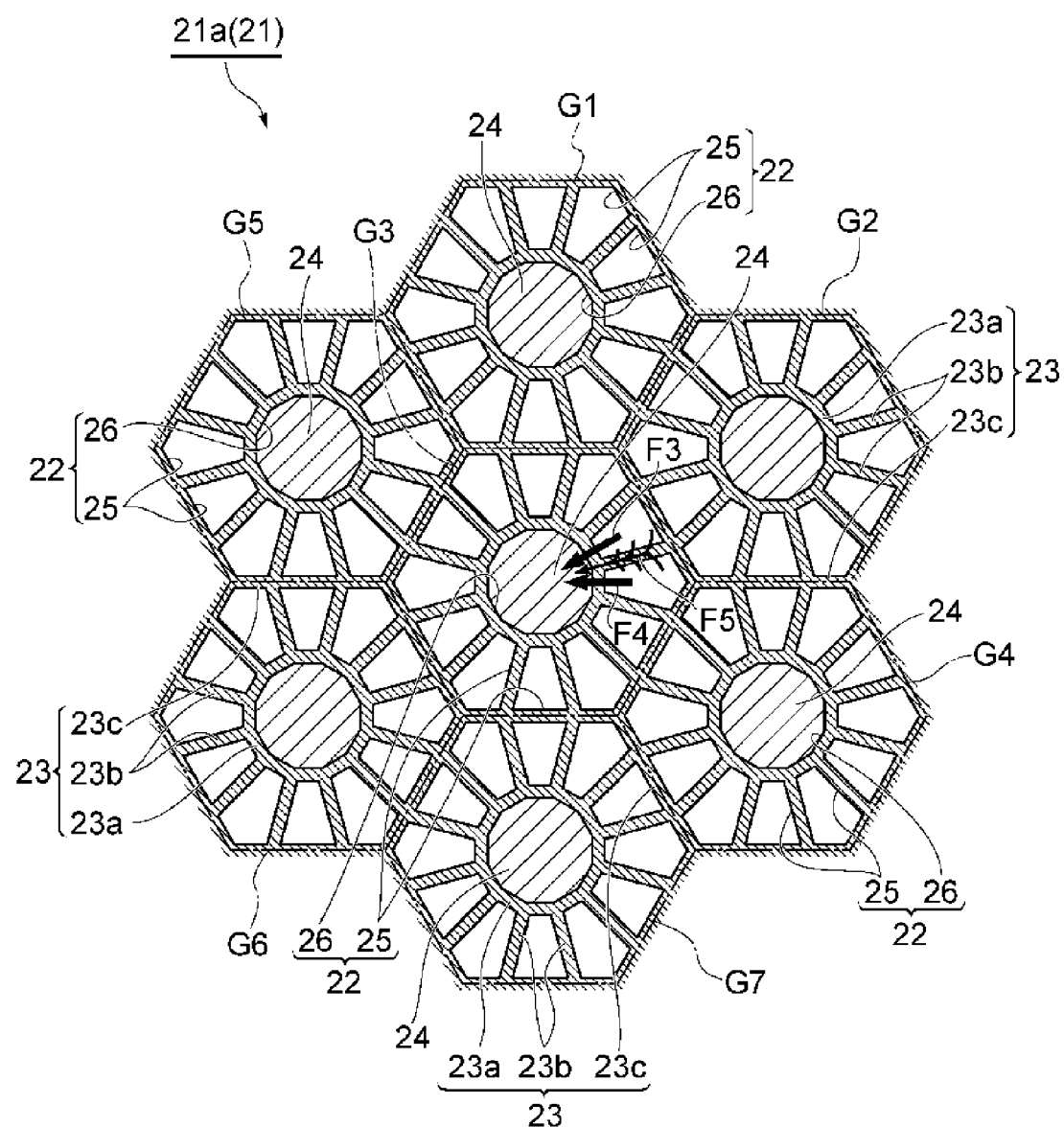
FIG. 5 shows the arrangement of channels in a honeycomb structure according to a second embodiment.

A honeycomb structure 21 according to a second embodiment differs from the honeycomb structure 1 according to the first embodiment in terms of the arrangement and the shape of channels 22 and a partition wall 23, as shown in FIG. 5.

Specifically, in each of the channel groups G1 to G7, twelve A channels 25, instead of six, are so arranged that they surround one B channel 26. The B channel 26 has a regular dodecagonal cross-sectional shape at a first end surface 21a, and the twelve A channels 25 are so arranged that they face the respective sides of the regular dodecagon. The twelve A channels 25 are so arranged that they are adjacent to the B channel 26 in the same channel group but are not adjacent to the B channels 26 in the other channel groups.

Each of the twelve A channels 25 has a rectangular or pentagonal cross-sectional shape at the first end surface 21a, and the twelve A channels 25 along with the regular dodecagonal B channel 26 form a regular hexagonal channel group.

Further, as part of the partition wall 23 in the second embodiment, each standard wall 23a is regular dodecagonally arranged at the first end surface 1a. Twelve common walls 23b are radially formed from each of the regular dodecagonal standard walls 23a. The common walls 23b are so formed that they extend outward (toward outer circumference of honeycomb structure 21) radially from the vertices of the regular dodecagonal standard wall 23a at the first end surface 21a.

In the second embodiment as well, a group partition wall 23c is formed in the form of a honeycomb formed of regular hexagons and surrounds the channel groups G1 to G7 separately in accordance with the groups. In two channel groups adjacent to each other, the group partition wall 23c is a wall that separates the channel groups. Specifically, the group partition wall 23c separates A channels 25 in one channel group from those in an adjacent channel group. In the honeycomb structure 21 according to the second embodiment, the standard walls 23a, the common walls 23b, and the group partition wall 23c are so formed that they have the same thickness.

The arrows F3 to F5 indicate the flow of the exhaust gas in the honeycomb structure 21 according to the second embodiment. The arrows F3 and F4 indicate a primary flow of the exhaust gas that flows from A channels 25, passes through the standard wall 23a, and flows into the corresponding B channel 26. The arrow F5 indicates the flow of part of the exhaust gas that flows from portions the vicinity of the common wall 23b and the group partition wall 23c into the common wall 23b, passes through the common wall 23b, and flows through the standard wall 23a into the B channel 26.

The thus configured honeycomb structure 21 according to the second embodiment can provide the same advantageous effects as those provided by the first embodiment. Further, since a greater number of common walls 23b are formed in a single channel group and the A channels 25 are divided into narrower channels, the burned gas in the A channels 25 is unlikely to exit into the B channels 26, whereby soot in the honeycomb structure can be more mildly burned.

Third Embodiment

Figure 6:
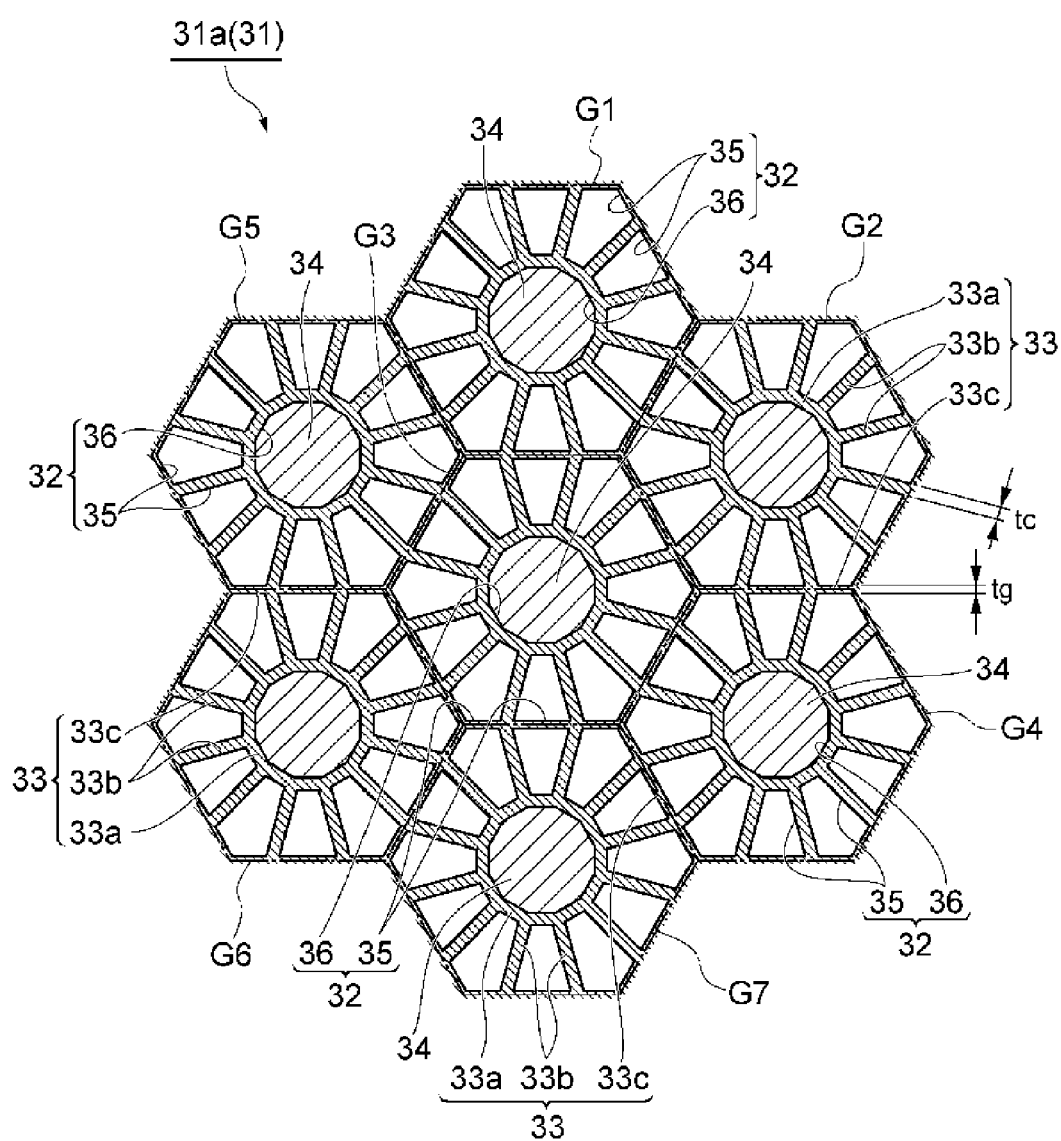
FIG. 6 shows the arrangement of channels in a honeycomb structure according to a third embodiment.

A honeycomb structure 31 according to a third embodiment differs from the honeycomb structure 21 according to the second embodiment only in that a group partition wall 33c is thinner than the group partition wall in the honeycomb structure 21, as shown in FIG. 6. The other configurations are the same as those in the second embodiment and will not therefore be described.

Specifically, in the honeycomb structure 31 according to the third embodiment, the group partition wall 33c is so formed that the thickness tg thereof is smaller than the thickness tc of common walls 33b. Each of the common walls 33b and standard walls 33a has a constant thickness, and the common walls 33b and the standard walls 33a are so formed that they have the same thickness.

The thus configured honeycomb structure 31 according to the third embodiment can provide the same advantageous effects as those provided by the honeycomb structure 21 according to the second embodiment. Further, since the thickness tg of the group partition wall 33c is smaller than the thickness of each of the standard walls 33a and the common walls 33b, the opening ratio of A channels 35 separated from each other by the group partition wall 33c can be increased, whereby soot collection efficiency of the honeycomb structure can be improved. Moreover, the improvement in soot collection efficiency increases the amount of soot that suppresses the burning, whereby the soot can be more mildly burned in the honeycomb structure.

Fourth Embodiment

Figure 7:
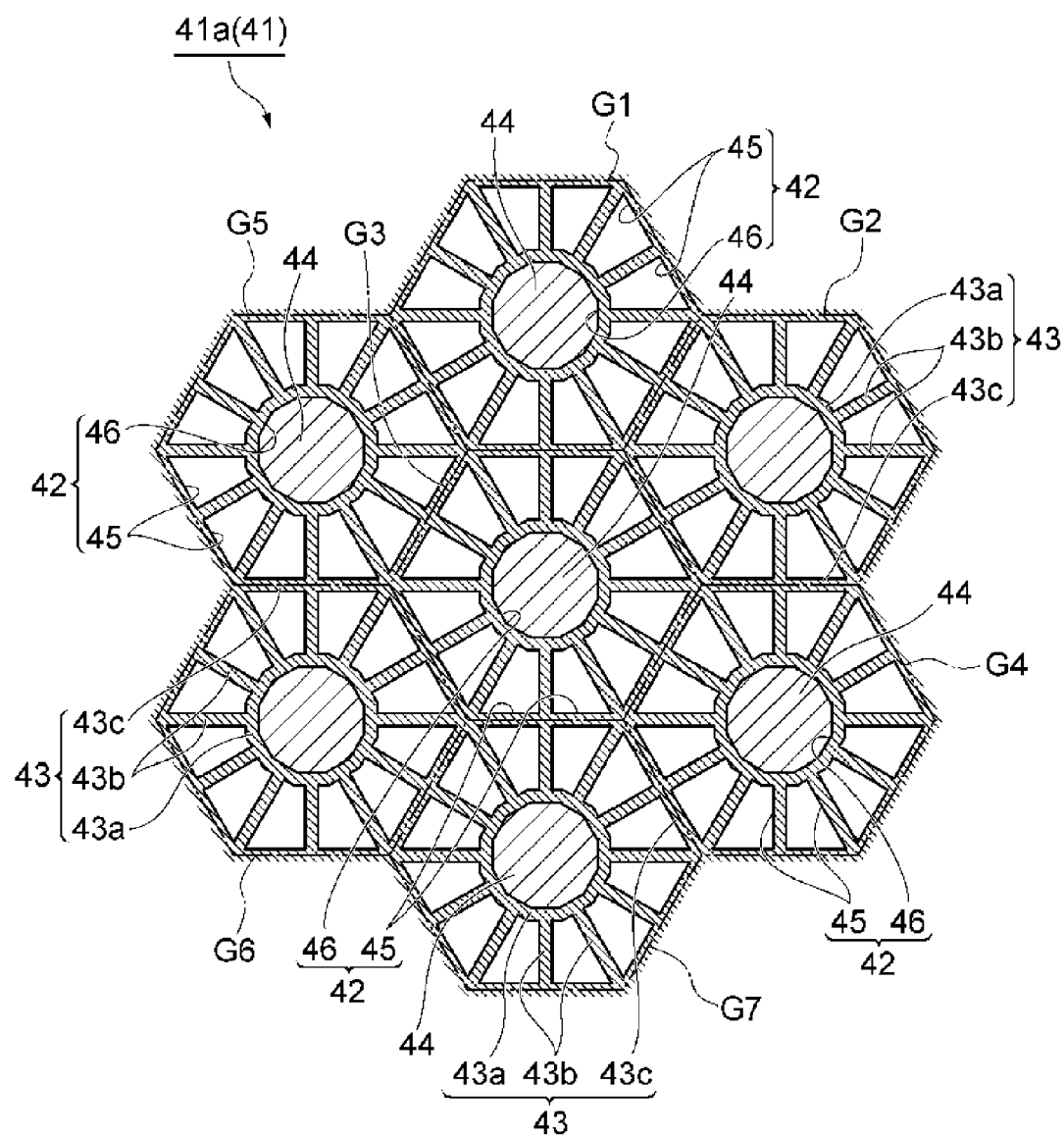
FIG. 7 shows the arrangement of channels in a honeycomb structure according to a fourth embodiment.
Figure 8:
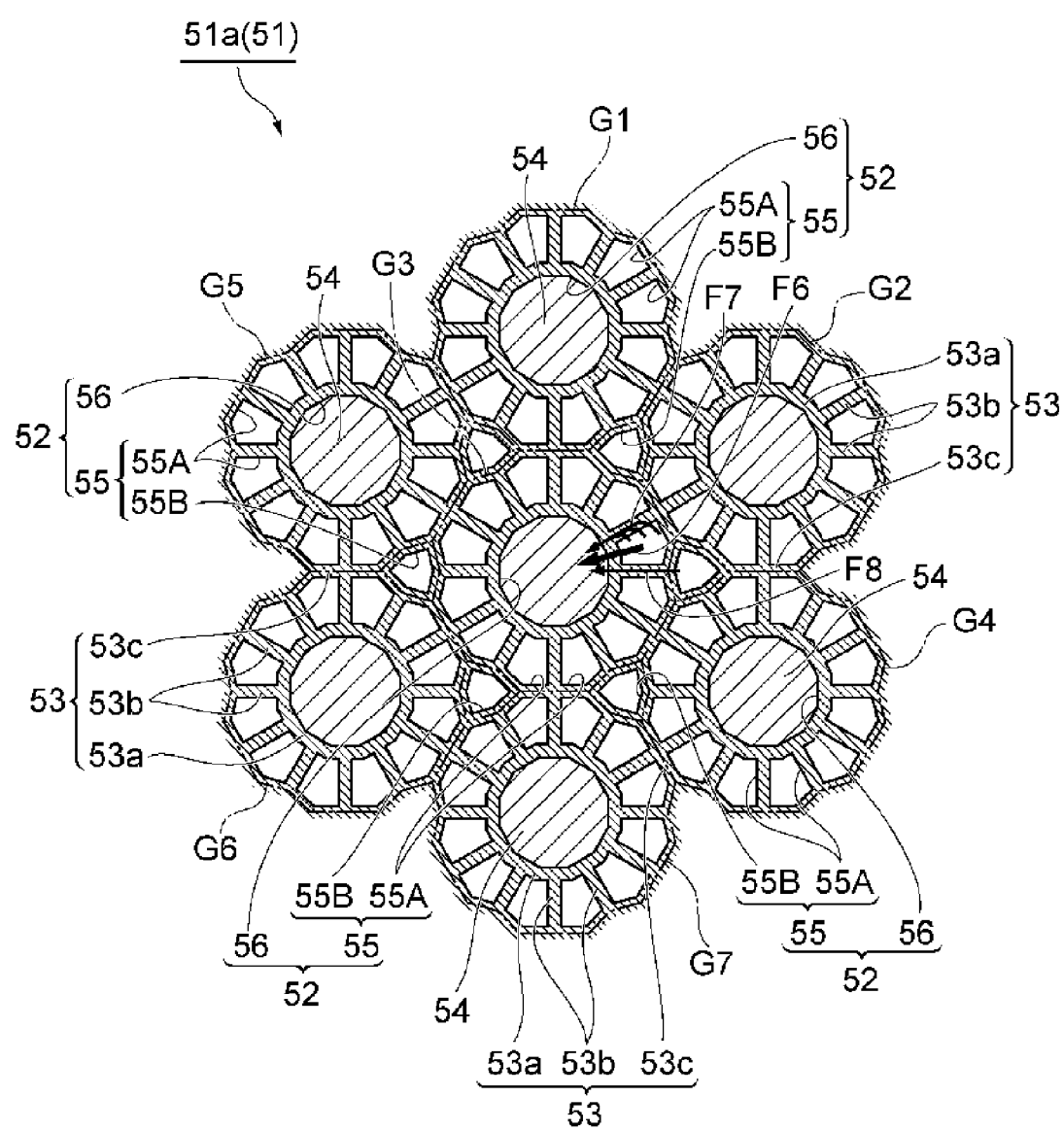
FIG. 8 shows the arrangement of channels in a honeycomb structure according to a fifth embodiment.

A honeycomb structure 41 according to a fourth embodiment differs from the honeycomb structure 21 according to the second embodiment only in terms of the arrangement and the shape of A channels 45, as shown in FIG. 7. The other configurations are the same as those in the second embodiment and will not therefore be described.

Specifically, in the honeycomb structure 41 according to the fourth embodiment, twelve common walls 43b are so formed in each of the channel groups that they radially extend outward (toward outer circumference of honeycomb structure 41) from the centers of the respective sides of a regular dodecagonal standard wall 43a. The configuration differentiates the arrangement and the shape of the A channels 45 separated by the common walls 43b from those in the second embodiment.

The thus configured honeycomb structure 41 according to the fourth embodiment can also provide the same advantageous effects as those provided by the honeycomb structure 21 according to the second embodiment.

Fifth Embodiment

A honeycomb structure 51 according to a fifth embodiment differs from the honeycomb structure 41 according to the fourth embodiment primarily in that A channels 55 are accompanied by channels 55B, which are not adjacent to B channels 56.

In the honeycomb structure 51 according to the fifth embodiment, the A channels 55 have adjacent channels 55A, which are adjacent to the B channels 56, and interstice channels 55B, which are not adjacent to the B channels 56. In each of the channel groups G1 to G7, the adjacent channels 55A are formed of twelve channels so arranged that they surround one B channel 56. The twelve adjacent channels 55A are arranged in correspondence with the vertices of the B channel 56 having a regular dodecagonal cross-sectional shape.

The interstice channels 55B are channels that belong to none of the channel groups G1 to G7. That is, each of the channel groups G1 to G7 according to the fifth embodiment is formed of one B channel 56 and twelve adjacent channels 55A. The interstice channels 55B are channels that are part of the A channels 55 and are open at a first end surface 51a and closed at a second end surface (not shown) closed by closing members 54. The interstice channels 55B will be described later in detail.

As a part of a partition wall 53 in the fifth embodiment, each standard wall 53a is regular dodecagonally arranged at the first end surface 51a. Twelve common walls 53b are so formed that they radially extend outward (toward outer circumference of honeycomb structure 51) from the centers of the respective sides of each of the regular dodecagonal standard walls 53a.

Each group partition wall 53c is so disposed that it forms a substantially regular dodecagonal shape at the first end surface 51a. The group partition wall 53c is so formed that it is separated from the corresponding regular dodecagonal standard wall 53a and connected to the corresponding radially extendingly formed common walls 53b. Channels formed by the group partition walls 53c that separate channel groups adjacent to each other are the interstice channels 55B.

The arrows F6 to F8 indicate the flow of the exhaust gas in the honeycomb structure 51 according to the fifth embodiment. The arrow F6 indicates a primary flow of the exhaust gas that flows from one of the A channels 55, passes through the corresponding standard wall 53a, and flows into the corresponding B channel 56.

The arrow F7 indicates the flow of part of the exhaust gas that flows from portions in the vicinity of the common wall 53b and the group partition wall 53c into the common wall 53b, flows through the common wall 53b, and flows through the standard wall 53a into the B channel 56. The arrow F8 indicates the flow of part of the exhaust gas that flows from one of the interstice channels 55B, passes through the group partition wall 53c into the common wall 53b, passes through the common wall 53b, and flows through the standard wall 53a into the B channel 56. The flow of the exhaust gas described above causes soot to be collected by the common wall 53b and the group partition wall 53c as well as the standard wall 53a, and a soot layer builds up thereon.

Figure 9:
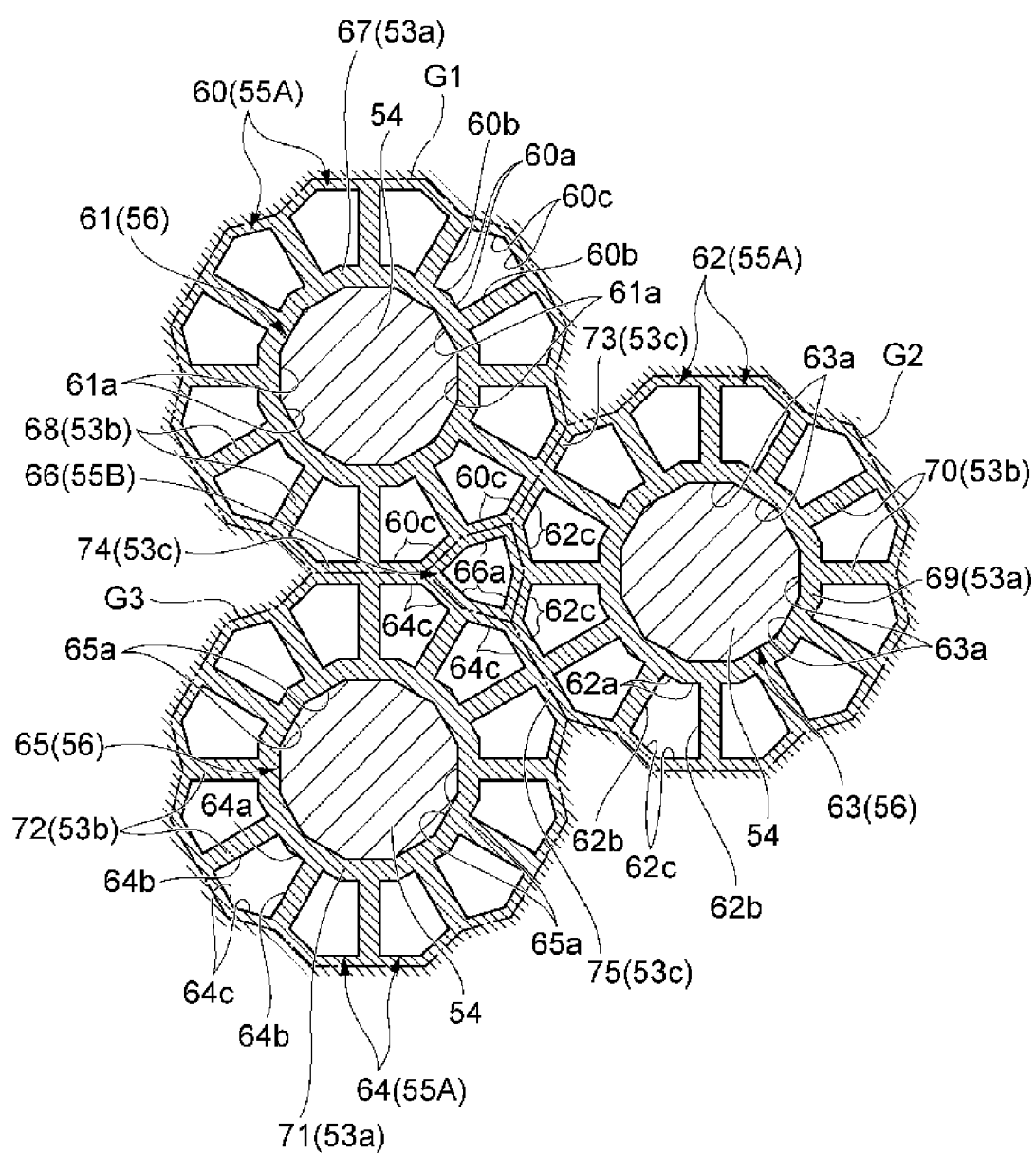
FIG. 9 is an enlarged view of part of FIG. 8 and shows three channel groups.

The interstice channels 55B will next be described in detail with reference to the three channel groups G1 to G3. FIG. 9 is an enlarged view showing the channel groups G1 to G3. The channels that form the channel groups G1 to G3 extend in substantially parallel to each other.

In FIG. 9, the twelve adjacent channels 55A that form the channel group G1 are called first A channels 60, and the B channel 56 that forms the channel group G1 is called a first B channel 61. Similarly, the twelve adjacent channels 55A that form the channel group G2 are called second A channels 62, and the B channel 56 that forms the channel group G2 is called a second B channel 63. Further, the twelve adjacent channels 55A that form the channel group G3 are called third A channels 64, and the B channel 56 that forms the channel group G3 is called a third B channel 65. Further, the interstice channel 55B in FIG. 9 is called an interstice channel 66.

Further, in the channel group G1, the standard wall 53a that separates the first A channels 60 from the first B channel 61 is called a first standard wall 67, and the common wall 53b that separates adjacent two first A channels 60 from each other is called a first common wall 68. Similarly, in the channel group G2, the standard wall 53a that separates the second A channels 62 from the second B channel 63 is called a second standard wall 69, and the common wall 53b that separates adjacent two second A channels 62 from each other is called a second common wall 70.

Further, in the channel group G3, the standard wall 53a that separates the third A channels 64 from the third B channel 65 is called a third standard wall 71, and the common wall 53b that separates adjacent two third A channels 64 from each other is called a third common wall 72.

Further, the group partition wall 53c that separates the channel group G1 and the channel group G2 from each other is called a first group partition wall 73. The group partition wall 53c that separates the channel group G1 and the channel group G3 from each other is called a second group partition wall 74. The group partition wall 53c that separates the channel group G2 and the channel group G3 from each other is called a third group partition wall 75.

The first A channels 60, each of which has a hexangular cross-sectional shape, are so disposed that two sides 60a of the hexangular cross-sectional shape located on the side facing the first B channel 61 face corresponding sides 61a of the first B channel 61 having a regular dodecagonal cross-sectional shape, as shown in FIG. 9.

The sides 60a of the first A channels 60 and the side 61a of the first B channel 61, which face each other, are separated by the first standard wall 67. Further, the opposing sides 60b of two first A channels 60 adjacent to each other in the channel group G1 are separated from each other by the corresponding first common wall 68.

Each of the channel groups G2 and G3 has the same configuration as that of the channel group G1. That is, in the channel group G2, sides 62a of second A channels 62 and sides 63a of the second B channel 63, which face each other, are separated by the second standard wall 69. Further, opposing sides 62b of two second A channels 62 adjacent to each other in the channel group G2 are separated from each other by the corresponding second common wall 70.

Similarly, in the channel group G3, sides 64a of third A channels 64 and sides 65a of the third B channel 65, which face each other, are separated by the third standard wall 71. Further, opposing sides 64b of two third A channels 64 adjacent to each other in the channel group G3 are separated by the corresponding third common wall 72.

The group partition walls 73 to 75 will next be described. The first group partition wall 73 is a wall that separates the two channel groups G1 and G2. Among the channels that form the channel group G1 and the channel group G2, the first group partition wall 73 separates sides 60c of the first A channels 60 and sides 62c of the second A channels 62, which are adjacent to each other.

Similarly, the second group partition wall 74 is a wall that separates the channel groups G1 and G3. Among the channels that form the channel group G1 and the channel group G3, the second group partition wall 74 separates the sides 60c of the first A channels 60 and sides 64c of the third A channels 64, which are adjacent to each other. Further, the third group partition wall 75 is a wall that separates the channel groups G2 and G3. Among the channels that form the channel group G2 and the channel group G3, the third group partition wall 75 separates the sides 62c of the second A channels 62 and the sides 64c of the third A channels 64, which are adjacent to each other.

The interstice channel 66 is formed in a portion between the three channel groups G1 to G3 adjacent to each other but belongs to none of the channel groups G1 to G3. The interstice channel 66, which has a substantially triangular cross-sectional shape, is formed by the three group partition walls 73 to 75.

Specifically, the group partition walls 73 to 75 are so shaped that each end of a line segment is split to form a Y-shaped portion at the first end surface 51a, and the Y-shaped portions of the group partition walls 73 to 75 connected to each other in three directions form the interstice channel 66 having a substantially triangular cross-sectional shape. A side 66a that forms the cross-sectional shape of the interstice channel 66 faces any of the sides 60c of the first A channels 60, the sides 62c of the second A channels 62, and the sides 64c of the third A channels 64.

The first group partition wall 73 corresponds to the first partition wall set forth in the claims. The second group partition wall 74 corresponds to the second partition wall set forth in the claims. Similarly, the third group partition wall 75 corresponds to the third partition wall set forth in the claims.

The interstice channel 66 formed in a portion between the three channel groups G1 to G3 have been described above, and the interstice channels 55B formed in portions between the other sets of three channel groups have the same configuration.

The thus configured honeycomb structure 51 according to the fifth embodiment, which includes the group partition walls 53c, can provide the same advantageous effects as those provided by the honeycomb structure 21 according to second embodiment. Further, since the honeycomb structure 51 includes the interstice channels 55B, which are not adjacent to the B channels 56, the burned gas in the interstice channels 55B does not reach the B channels 56 unless the burned gas passes through the adjacent channels 55A around the interstice channels 55B, whereby the burned gas is unlikely to exit. The honeycomb structure 51 can therefore suppress further oxygen supply in the interstice channels 55B and hence delay burning of soot, whereby soot in the honeycomb structure can be more mildly burned.

Sixth Embodiment

Figure 10:
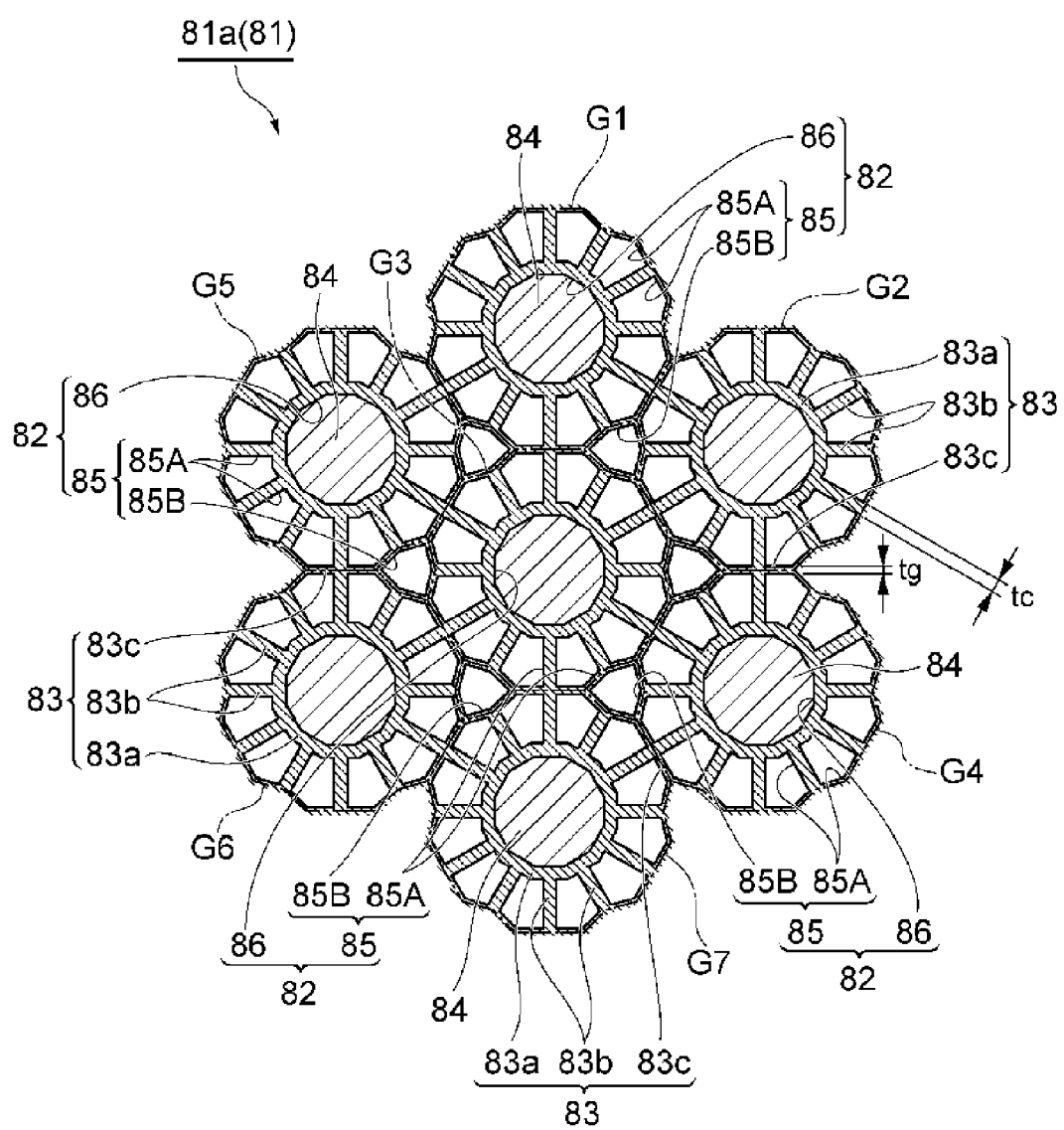
FIG. 10 shows the arrangement of channels in a honeycomb structure according to a sixth embodiment.

A honeycomb structure 81 according to a sixth embodiment differs from the honeycomb structure 51 according to the fifth embodiment only in that group partition walls 83c are thinner, as shown in FIG. 10. The other configurations are the same as those in the fifth embodiment and will not therefore be described.

Specifically, in the honeycomb structure 81 according to the sixth embodiment, the group partition walls 83c are so formed that the thickness tg thereof is smaller than the thickness tc of common walls 83b. The common walls 83b and standard walls 83a are so formed that they have the same thickness.

The thus configured honeycomb structure 81 according to the sixth embodiment can provide the same advantageous effects as those provided by the honeycomb structure 51 according to the fifth embodiment. Further, reducing the thickness tg of the group partition walls 83c allows A channels 85 separated by the group partition walls 83c to have a large opening ratio, whereby soot collection efficiency of the honeycomb structure can be improved. Moreover, the improvement in the collection efficiency increases the amount of soot that suppresses the burning, whereby the soot can be more mildly burned in the honeycomb structure.

Seventh Embodiment

Figure 11:
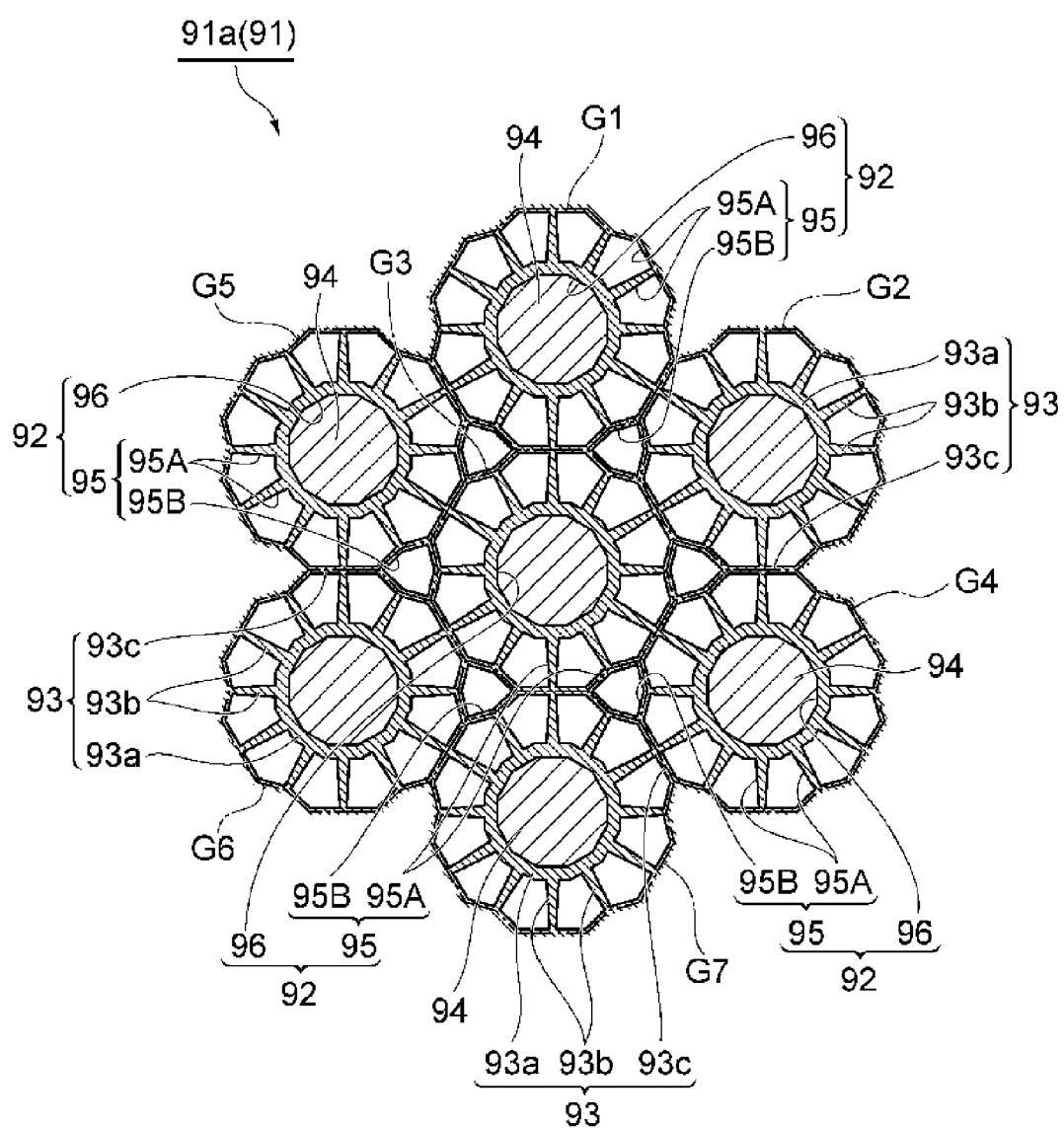
FIG. 11 shows the arrangement of channels in a honeycomb structure according to a seventh embodiment.

A honeycomb structure 91 according to a seventh embodiment differs from the honeycomb structure 81 according to the sixth embodiment only in terms of the thickness of common walls 93b, as shown in FIG. 11. The other configurations are the same as those in the sixth embodiment and will not therefore be described.

Specifically, in each of the channel groups, the common walls 93b are so formed that the thickness thereof gradually decreases with distance from a B channel 96. That is, at a first end surface 91a, each of the common walls 93b is thickest at a portion connected to a standard wall 93a and is thinnest at a portion connected to a group partition wall 93c.

The thus configured honeycomb structure 91 according to the seventh embodiment can provide the same advantageous effects as those provided by the honeycomb structure 81 according to the sixth embodiment. Reducing the thickness of the portion of the common walls 93b that is close to the group partition wall 93c allows A channels 95 to have an increased opening ratio, whereby soot collection efficiency of the honeycomb structure can be improved.

Eighth Embodiment

Figure 12:
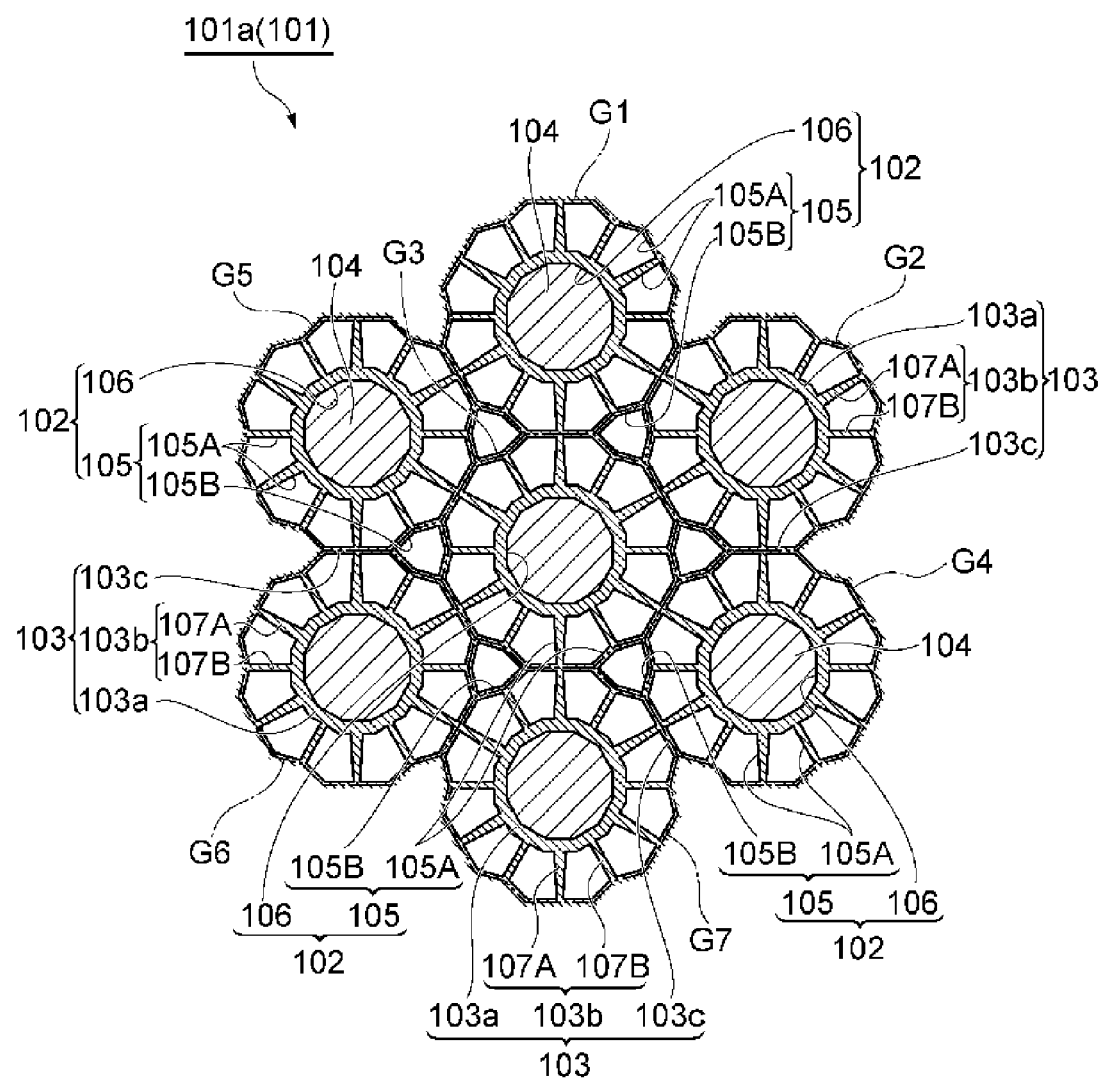
FIG. 12 shows the arrangement of channels in a honeycomb structure according to an eighth embodiment.

A honeycomb structure 101 according to an eighth embodiment differs from the honeycomb structure 91 according to the seventh embodiment only in that each common wall 103b is formed of two types of walls 107A and 107B, as shown in FIG. 12. The other configurations are the same as those in the seventh embodiment and will not therefore be described.

Specifically, twelve common walls 103b in each of the channel groups are classified into six tapered common walls 107A, which are so formed that the thickness thereof decreases with distance from a B channel 106, and six thin common walls 107B, which have a constant thickness. The thin common walls 107B are as thick as group partition walls 103c. That is, the thin common wall 107B are so formed that the thickness thereof is smaller than the thickness of standard walls 103a.

The thus configured honeycomb structure 101 according to the eighth embodiment can provide the same advantageous effects as those provided by the honeycomb structure 91 according to the seventh embodiment. Further, providing the thin common walls 107B, which are thinner than the tapered walls 107A, allows an increase in the opening ratio of A channels 105, whereby soot collection efficiency can be improved.

The embodiments of the present invention have been described above, but the present invention is not limited thereto. For example, the B channels do not necessarily have a regular hexagonal or regular dodecagonal cross-sectional shape and may have any other regular polygonal shape or a polygonal shape other than regular polygonal shapes (asymmetric polygonal shape, for example). The B channels may instead have a circular or elliptical cross-sectional shape. Similarly, the A channels do not necessarily have the cross-sectional shapes described above.

Further, the arrangement and shape of the partition walls are not limited to those in the embodiments described above, and a variety of aspects of the arrangement and the shape can be employed. The relationship among the thicknesses of the standard walls, the common walls, and the group partition walls is not limited to those in the embodiments described above. In addition to the common walls, the standard walls and the group partition walls may be so configured that the thicknesses thereof change location to location.

INDUSTRIAL APPLICABILITY

The present invention is applicable to a honeycomb structure that allows soot to be mildly burned in filter regeneration.

REFERENCE SIGNS LIST 1, 21, 31, 41, 51, 81, 91, 101 . . . Honeycomb structure, 1a, 21a, 31a, 41a, 51a, 81a, 91a, 101a . . . First end surface, 1b . . . Second end surface, 2, 22, 32, 42, 52, 82, 92, 102 . . . Channel, 3, 23, 33, 43, 53, 83, 93, 103 . . . Partition wall, 3a, 23a, 33a, 43a, 53a, 83a, 93a, 103a . . . Standard wall, 3b, 23b, 33b, 43b, 53b, 83b, 93b, 103b . . . Common wall, 3c, 23c, 33c, 43c, 53c, 83c, 93c, 103c . . . Group partition wall, 4, 24, 34, 44, 54, 84, 94, 104 . . . Closing member, 5, 25, 35, 45, 55, 85, 95, 105 . . . A channel, 6, 26, 36, 46, 56, 86, 96, 106 . . . B channel, 10, 60 . . . First A channel, 11, 61 . . . First B channel, 12, 62 . . . Second A channel, 13, 63 . . . Second B channel, 14, 67 . . . First standard wall, 15, 68 . . . First common wall, 16, 69 . . . Second standard wall, 17, 70 . . . Second common wall, 18, 73 . . . First group partition wall (first partition wall), 55A, 85A, 95A, 105A . . . Adjacent channel, 55B, 66, 85B, 95B, 105B . . . Interstice channel, 64 . . . Third A channel, 65 . . . Third B channel, 71 . . . Third standard wall, 72 . . . Third common wall, 74 . . . Second group partition wall (second partition wall), 75 . . . Third group partition wall (third partition wall), G1 to G7 . . . Channel group

The invention claimed is:

1. A honeycomb structure comprising:
a first end surface and a second end surface facing each other; and
partition walls that form a plurality of A channels and a plurality of B channels extending in a facing direction between the first end surface and the second end surface,
wherein the plurality of A channels are open at the first end surface and closed at the second end surface,
the plurality of B channels are closed at the first end surface and open at the second end surface,
the plurality of B channels include a first B channel and a second B channel extending substantially parallel to each other,
the plurality of A channels include a plurality of first A channels that surround the first B channel at the first end surface and a plurality of second A channels that surround the second B channel at the first end surface,
the plurality of first A channels are adjacent to the first B channel but are not adjacent to the second B channel at the first end surface,
the plurality of second A channels are adjacent to the second B channel but are not adjacent to the first B channel at the first end surface, and
the partition walls include a first standard wall that separates the plurality of first A channels and the first B channel from each other, a second standard wall that separates the plurality of second A channels and the second B channel from each other, a first common wall that separates adjacent two of the first A channels from each other, a second common wall that separates adjacent two of the second A channels from each other, and a first partition wall that separates adjacent channels of the first A channels and the second A channels from each other, wherein the first partition wall is thinner than the first standard wall and the second standard wall.

2. The honeycomb structure according to claim 1,
wherein the plurality of B channels include a third B channel that extends substantially parallel to the first B channel and the second B channel,
the plurality of A channels include a plurality of third A channels that surround the third B channel at the first end surface,
the plurality of third A channels are adjacent to the third B channel but are not adjacent to the first B channel or the second B channel at the first end surface,
the partition walls further include a second partition wall that separates adjacent channels of the first A channels and the third A channels from each other and a third partition wall that separates adjacent channels of the second A channels and the third A channels from each other, and
the plurality of A channels further includes an interstice channel formed by the first partition wall, the second partition wall, and the third partition wall.

3. The honeycomb structure according to claim 1,
wherein the first common walls and the second common walls are thinner than the first standard wall and the second standard wall.

4. A honeycomb structure comprising:
a first end surface and a second end surface facing each other; and
partition walls that form a plurality of A channels and a plurality of B channels extending in a facing direction between the first end surface and the second end surface,
wherein the plurality of A channels are open at the first end surface and closed at the second end surface,
the plurality of B channels are closed at the first end surface and open at the second end surface,
the plurality of B channels include a first B channel and a second B channel extending substantially parallel to each other,
the plurality of A channels include a plurality of first A channels that surround the first B channel at the first end surface and a plurality of second A channels that surround the second B channel at the first end surface,
the plurality of first A channels are adjacent to the first B channel but are not adjacent to the second B channel at the first end surface,
the plurality of second A channels are adjacent to the second B channel but are not adjacent to the first B channel at the first end surface, and
the partition walls include a first standard wall that separates the plurality of first A channels and the first B channel from each other, a second standard wall that separates the plurality of second A channels and the second B channel from each other, a first common wall that separates adjacent two of the first A channels from each other, a second common wall that separates adjacent two of the second A channels from each other, and a first partition wall that separates adjacent channels of the first A channels and the second A channels from each other,
wherein the first common walls and the second common walls are thinner than the first standard wall and the second standard wall.

5. The honeycomb structure according to claim 4,
wherein the plurality of B channels include a third B channel that extends substantially parallel to the first B channel and the second B channel,
the plurality of A channels include a plurality of third A channels that surround the third B channel at the first end surface,
the plurality of third A channels are adjacent to the third B channel but are not adjacent to the first B channel or the second B channel at the first end surface,
the partition walls further include a second partition wall that separates adjacent channels of the first A channels and the third A channels from each other and a third partition wall that separates adjacent channels of the second A channels and the third A channels from each other, and
the plurality of A channels further includes an interstice channel formed by the first partition wall, the second partition wall, and the third partition wall.

\* \* \* \* \*